United States Patent
Reddy et al.

(10) Patent No.: US 6,551,380 B1
(45) Date of Patent: Apr. 22, 2003

(54) RECOVERY OF $CO_2$ AND $H_2$ FROM PSA OFFGAS IN AN $H_2$ PLANT

(75) Inventors: Satish Reddy, Irvine, CA (US); Ravi Ravikumar, Lancaster, CA (US)

(73) Assignee: Fluor Corporation, Aliso Viejo, CA (US)

( * ) Notice: Subject to any disclaimer, the term of this patent is extended or adjusted under 35 U.S.C. 154(b) by 0 days.

(21) Appl. No.: 09/830,882

(22) PCT Filed: Nov. 11, 1999

(86) PCT No.: PCT/IB99/01808

§ 371 (c)(1),
(2), (4) Date: Jun. 25, 2001

(87) PCT Pub. No.: WO00/27505

PCT Pub. Date: May 18, 2000

Related U.S. Application Data

(60) Provisional application No. 60/107,992, filed on Nov. 10, 1998.

(51) Int. Cl.[7] ...................... B01D 53/047; B01D 53/14

(52) U.S. Cl. ................ 95/41; 95/42; 95/94; 95/96; 95/116; 95/139; 95/140; 95/143; 95/172; 95/177; 95/236; 96/131; 96/136; 96/142; 96/243; 96/365

(58) Field of Search ............... 95/41, 42, 92–94, 95/96–98, 100–105, 139, 140, 143, 163, 166, 172, 177, 186, 236; 96/130, 131, 136, 142, 144, 243, 355, 365

(56) References Cited

U.S. PATENT DOCUMENTS

| 3,430,418 | A | * | 3/1969 | Wagner | 55/25 |
| 3,986,849 | A | * | 10/1976 | Fuderer et al. | 55/25 |
| 4,229,188 | A | * | 10/1980 | Intille | 55/16 |
| 4,333,744 | A | * | 6/1982 | Fuderer | 55/25 |
| 4,553,981 | A | * | 11/1985 | Fuderer | 48/62 R |
| 4,913,709 | A | * | 4/1990 | Kumar | 55/26 |
| 4,963,339 | A | | 10/1990 | Krishnamurthy et al. | 95/98 |
| 5,435,836 | A | * | 7/1995 | Anand et al. | 95/45 |
| 5,500,035 | A | | 3/1996 | Zarchy et al. | 95/41 |
| 5,681,369 | A | | 10/1997 | Osborne | 95/93 |
| 5,879,433 | A | | 3/1999 | Gallup et al. | 96/243 X |
| 5,980,857 | A | | 11/1999 | Kapoor et al. | 95/139 X |

* cited by examiner

Primary Examiner—Robert H. Spitzer
(74) Attorney, Agent, or Firm—Rutan & Tucker, LLP

(57) ABSTRACT

A gas separation apparatus and process has a first pressure swing adsorption (PSA) unit (110) receiving feed gas (112), which comprises a first and a second component. First PSA unit (110) produces first product gas (114) pre-dominantly containing the first component, and first off gas (116) containing at least some of the first component and second component. Compressor (120) is coupled to first PSA unit (110) to compress first off gas (116) to form compressed off gas (126), which is passed downstream to absorber unit (130), which employs a solvent to remove at least part of the second component from compressed off gas (126), forming an enriched compressed off gas (136B). Second PSA unit (140) receives enriched compressed off gas (136B) and produces second product gas (142) which predominantly contains the first component and a second off gas that is sent to waste or reformer burner (150).

18 Claims, 3 Drawing Sheets

RECOVERY OF $CO_2$ AND $H_2$ FROM PSA OFFGAS IN AN $H_2$ PLANT

This application is a national phase application of international patent application No. PCT/IB99/01808 and further claims benefit of U.S. provisional application No. 60/107,992 filed Nov. 10, 1998 incorporated herein by reference in its entirety.

FIELD OF THE INVENTION

The field of the invention is recovery of gases from the offgas in a pressure swing adsorption unit in hydrogen production.

BACKGROUND OF THE INVENTION

Pressure swing adsorption (PSA) is a well known process for re cove ring light gases from mixtures which also contain heavier, more readily adsorbable components, and the recovery of hydrogen from steam-methane syngas containing hydrogen, carbon oxides, and methane is a particularly well suited application of the PSA process.

A typical PSA process and apparatus is described in U.S. Pat. No. 3,430,418 to Wagner and in U.S. Pat. No. 3,986,849 to Fuderer, both of which are incorporated by reference herein. With an increasing demand of highly purified gases, various improvements were developed to help overcome limitations in the original process with respect to flow rates, capacity, and yield. For example, Fuderer describes in U.S. Pat. No. 4,333,744 an increase in yield employing a particular PSA loading pattern in which a first portion of a feed stream is pretreated to remove substantial amounts of an unwanted component, and a second portion is loaded in an untreated form. Although the Fuderer's methods may increase the overall amount of purified gas and may advantageously increase the flow rate, the offgas is eventually directed to a waste line, or into a reformer burner, and components of interest in the offgas are concomitantly lost.

To avoid concomitant losses of desirable components in the offgas stream, various recovery methods were developed. One method of recovering desirable components employs membranes that either concentrate or filtrate hydrogen in the offgas stream. For example, G. Intille describes in U.S. Pat No. 4,229,188 the use of hydrogen-permeable membranes to recover $H_2$ from the offgas. Intille's membranes advantageously remove $H_2$ with high selectivity in a single process step, however, the use of such membranes typically requires relatively high pressure, thereby increasing the overall energy demand. To avoid at least some of the problems associated with hydrogen-permeable membranes, Anand et al. teach in U.S. Pat. No. 5,435,836 the use of an adsorbent membrane. Adsorbent membranes generally allow hydrogen recovery at comparably low pressure with relatively high specificity. The advantage of relatively low pressure, however, tends to be offset by the need of membrane exchange, thereby either increasing the complexity of the hydrogen plant. or necessitating discontinuous operation.

Another method utilizes a serial configuration of PSA units, wherein a first PSA unit has a different selectivity from a second PSA unit, and wherein the offgas from the first unit is directed to the feed end of the second PSA unit. An example for this configuration is described by R. Kumar in U.S. Pat. No. 4,913,709. Kumar's serial configuration of PSA units with beds having non-identical adsorption specificity is favorable because relatively high volumes of offgas may be purified at a time. However, the complexity and number of coordinated cycle steps generally increases due to the different physico-chemical properties of the adsorbent beds.

In still another method, U.S. Pat. No. 4,553,981 to Fuderer, the feed gas of a PSA unit is pretreated to remove a second component at least in part, while the PSA unit purifies a first component. A first portion of the offgas of the PSA unit is recycled into the same PSA unit, and a second portion of the offgas is directed to a waste line. Alternatively, a first portion of the offgas is directed to a second PSA unit having the same specificity, and the offgas of the second PSA unit is fed to a waste line. By removing the second component from the feed gas before the feed gas enters the PSA unit, the offgas will typically have a higher relative purity, and a remaining portion of the first component may therefore be easier to extract. However, the second component in Fuderer's configuration typically needs to be further purified.

Although various improvements have been developed to increase the recovery rate of desirable components in the offgas from PSA units, all or almost all of them have one or more than one disadvantage. Thus, there is a need to provide methods and apparatus for increased recovery of desirable components in the offgas from a PSA unit.

SUMMARY OF THE INVENTION

The present invention is directed to a gas separation apparatus that has a first pressure swing adsorption (PSA) unit receiving a feed gas comprising a first and a second component. The first PSA unit produces a first product gas predominantly comprising the first component, and a first offgas comprising at least some of the first component and the second component. A compressor is coupled to the first PSA unit and compresses the offgas to form a compressed offgas, and an absorber unit downstream of the compressor employs a solvent to remove at least part of the second component from the compressed offgas, thereby forming an enriched compressed offgas. A second PSA unit receives the enriched compressed offgas and produces a second product gas predominantly comprising the first component, and a second offgas. The gas separation apparatus may further comprise a flash unit and a gas liquefaction unit, which is preferably an autorefrigeration system.

In one aspect of the inventive subject matter, the feed gas is an effluent gas stream from a steam reformer and/or shift converter, and preferably comprises $H_2$ and $CO_2$ in excess over CO, $CH_4$, and other gaseous products. The first and second PSA units are preferably hydrogen PSA units, and while the offgas from the first PSA unit is used to recover first and second components, the offgas from the second PSA unit is preferably routed to a reformer burner.

In another aspect of the inventive subject matter, a method of recovering a first and a second component from an offgas of a PSA unit includes a first step in which the offgas is compressed to produce a compressed offgas stream. In a next step at least some of the second component is recovered from the compressed offgas stream to produce an enriched compressed offgas stream. The enriched compressed offgas stream is passed to a second PSA unit to recover at least some of the first component.

Various objects, features, aspects and advantages of the present invention will become more apparent from the following detailed description of preferred embodiments of the invention, along with the accompanying drawings in which like numerals represent like components.

DETAILED DESCRIPTION

As used herein, the term "absorber unit" refers to a device other than a PSA unit in which at least one component of a gas mixture is absorbed from the gas mixture using an absorbent. Contemplated absorbents comprise liquids, and especially contemplated absorbents include $CO_2$ absorbing liquids such as Selexol™ or Fluor Solvent™ (Propylene carbonate).

As also used herein, the term "autorefrigeration system" refers to a device that produces high purity liquid $CO_2$ using $CO_2$ as a refrigerant. An especially contemplated autorefrigeration system is described in PCT application PCT/US99/00087 to S. Reddy, incorporated herein by reference.

As further used herein the term "hydrogen PSA unit" refers to a PSA unit that is configured to produce a product gas stream predominantly comprising hydrogen. Similarly, a "$CO_2$ PSA unit" is a PSA unit that is configured to produce a product gas stream predominantly comprising carbon dioxide. The term "predominantly comprising" means that the product gas stream comprises at least 50% of the carbon dioxide, hydrogen, or other compound that is predominantly present in a product.

Figure 1:
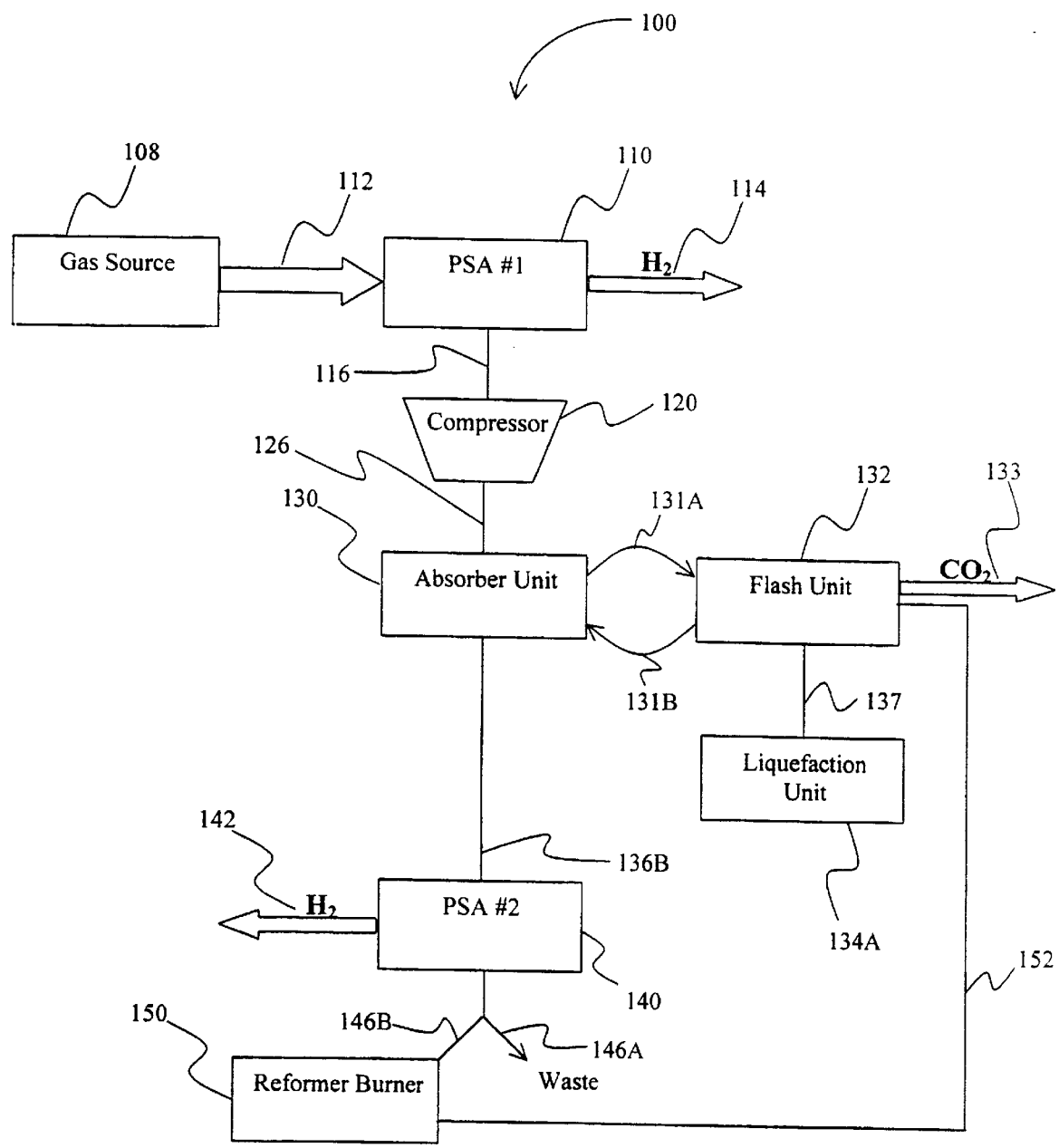
FIG. 1 is a schematic of an apparatus for recovering a first and a second component from an offgas of a PSA according to the inventive subject matter.

In FIG. 1, a hydrogen production plant 100 generally comprises a first PSA unit 110 that receives feed gas 112 comprising a first and a second component from a gas source 108. The first PSA unit 110 produces product gas 114, predominantly comprising the first component, and the offgas comprising at least some of the first and second component from the first PSA unit is directed to a compressor 120 via the offgas line 116. The compressed offgas from the compressor is directed via a compressed offgas line 126 to an absorber unit 130, which stands via solvent lines 131A and 131B in fluid communication with a flash unit 132. The flash unit releases concentrated gaseous $CO_2$ product 133, which may optionally be directed to a reform burner 150 via line 152. Alternatively, gaseous $CO_2$ may be directed to a liquefaction unit 134A via $CO_2$ line 137. The hydrogen enriched compressed offgas from the absorber unit 130 is directed to a second PSA unit 140 via enriched compressed offgas line 136B. The second PSA unit 140 produces product gas 142, and the offgas is directed to a waste stream via offgas line 146A, or to a reformer burner 150 via offgas line 146B.

In a preferred embodiment the gas source 108 is a steam reformer that produces the feed gas 112, which predominantly comprises $H_2$, CO, $CO_2$, and $CH_4$. The first PSA unit 110 is a hydrogen specific PSA unit with 8 adsorption beds, and a $H_2$ production capacity of about 100000 $Nm^3$/hr at operating pressures between 250 and 500 psig. The product gas 114 produced by the first PSA unit is hydrogen. Compressor 120 is a centrifugal-type compressor compressing the offgas containing $H_2$, CO, $CO_2$, and $CH_4$ from the first PSA unit to approximately 300–500 psig. The absorber 130 is a packed bed-type absorber utilizing solvent absorption with Fluor Solvent™ to absorb $CO_2$ from the compressed offgas, thereby producing a $CO_2$-rich solvent and a hydrogen enriched compressed offgas. The solvent containing the absorbed $CO_2$ is transferred to a flash unit and the concentrated $CO_2$ product 133 is recovered by letting the $CO_2$-rich solvent down in about 0–50 psia. The regenerated solvent is subsequently recycled to the absorber 130. Liquefaction unit 134A is an autorefrigeration system that receives and liquefies $CO_2$ from the flash unit. The hydrogen enriched compressed offgas is directed via enriched compressed offgas line 136B to a second PSA unit 140, which is identical in selectivity with the first PSA unit. The second PSA unit produces $H_2$ as a product gas 142. The offgas from the second PSA unit is directed via offgas line 146B to a reformer burner, or via offgas line 146A to a waste. All lines are conventional pressure resistant lines and are well known in the art.

In alternative embodiments, the gas source 108 need not be limited to a steam reformer, but may vary depending on the particular method of hydrogen production. Therefore, where relatively high levels of CO are present, a shift converter may be included. In other aspects, the gas source may comprise alternative hydrogen sources, including sources performing partial oxidation of various hydrocarbons, or coal gasification. It should also be appreciated that the gas source may comprise elements that are employed in gas purification rather than production. Thus, purification apparatus including PSA units, absorber units, etc. are also contemplated. In still other aspects, the gas source need not be limited to a source producing predominantly hydrogen, but may also include sources producing $N_2$, He, Ar, etc.

Consequently, the feed gas 112 need not be restricted to a gas mixture predominantly comprising $H_2$, CO, $CO_2$, and $CH_4$. Alternative feed gases are contemplated to include gas mixtures comprising $C_2$–$C_6$ hydrocarbons, and higher, which may or may not be aliphatic, inert gases such as $N_2$, He, Ar, or pre-treated gas mixtures that have been enriched with, or depleted of one or more compounds. For example, a gas mixture from a steam reformer may be pre-treated with an absorbent to remove $CO_2$.

With respect to the first PSA unit 110 it is contemplated that, although a hydrogen specific PSA unit with 8 adsorption beds, and a $H_2$ production capacity of 100000 $Nm^3$/hr at operating pressures between 250 and 500 psig is preferred, various other PSA units may also be utilized. There are various PSA units known in the art and contemplated appropriate herein, so long as alternative PSA units produce a PSA specific product gas, and an offgas comprising at least two gaseous components. Therefore, product gas 114 need not necessarily be hydrogen, but—depending on the specificity of alternative PSA units—may also be other gases, including $CO_2$, $CH_4$, $N_2$, CO, etc.

Compressor 120 is preferably a centrifugal-type compressor, however, various other types of compressors are also contemplated, so long as alternative compressors are capable of compressing the offgas from the first PSA unit to a level that allows the absorption of at least one component with a solvent in a subsequent absorber unit. Therefore, contemplated compressors may include screw-type compressor, or a reciprocating compressor. With respect to the compression of the offgas of the first PSA unit, it is contemplated that appropriate compressors produce pressures of less than 50 psig, 50–200psig, 200–400 psig, 400–600 psig, and more than 600 psig.

In further alternative embodiments absorber 130 need not be limited to a packed bed-type absorber utilizing solvent absorption with Fluor Solvent™ to absorb $CO_2$, and various alternative absorber types are also contemplated, including a trayed-type absorber. Likewise, the solvent may be different from the Fluor Solvent™, so long as the solvent is sufficiently specific to a desired gaseous component. For example, where $CO_2$ is the desired gaseous component, Selexol™ or analogous solvents are contemplated.

It is especially contemplated that the desired gaseous component is recovered from the rich solvent (i.e. the solvent containing the absorbed gas) as a flash gas by reducing the pressure in a flash unit to a level of preferably 0–65 psia. However, alternative pressure levels are also contemplated including pressures within a range of 0 psia to absorber pressure. This is particularly advantageous, because decompression of a rich solvent typically avoids conventional methods of producing an enriched solvent employing a heated stripper. However, where appropriate, it is contemplated that the rich solvent may also be stripped in a conventional steam- or otherwise heated stripper. Consequently, product 133 is not restricted to $CO_2$ but may also be other gases, including CO, $CH_4$, $N_2$, etc.

With respect to liquefaction unit 134A, various types of gas liquefying other than auto-refrigeration are also contemplated, including processes requiring an external refrigerant such as ammonia, fluorohydrocarbons, or fluorochlorohydrocarbons. The liquefied $CO_2$ from liquefaction unit 134A preferably has a purity of greater than 98%(v/v), more preferably greater than 99%(v/v), and most preferably greater than 99.9%(v/v).

In still other aspects of the inventive subject matter, the second PSA 140 unit need not necessarily be of the same type and capacity as the first PSA unit. For example, it is contemplated that while the specificity of the second PSA unit may be identical with the first PSA unit, the capacity, flow rate, or number of adsorbent beds may vary considerably. Where the amount of the desirable component is relatively small, a smaller PSA unit may be employed. In other cases, where processed offgases from multiple PSA units are combined to feed a single PSA unit, the second PSA units may have a larger capacity of increased flow rate. Furthermore, the specificity of the second PSA unit may also be different from the specificity of the first PSA unit. This may be especially advantageous where a third component is isolated from the offgas from the first PSA unit.

Although it is preferred that the offgas from the second PSA unit is directed to a waste line or a reformer burner, it is contemplated that the offgas may also be utilized for other process steps that may or may not preserve the kinetic or chemical energy contained in the offgas, These process steps may include feeding a third PSA- or absorber unit, a burner other than a reformer burner, and so on. For example, a line may connect the second PSA unit with a reformer burner. It should also be appreciated that, although not specifically included in the preferred embodiment, one or more than one storage vessels may be included in the process to temporarily reduce pressure and/or gas volume in the PSA and/or absorber and liquefaction unit.

Figure 2:
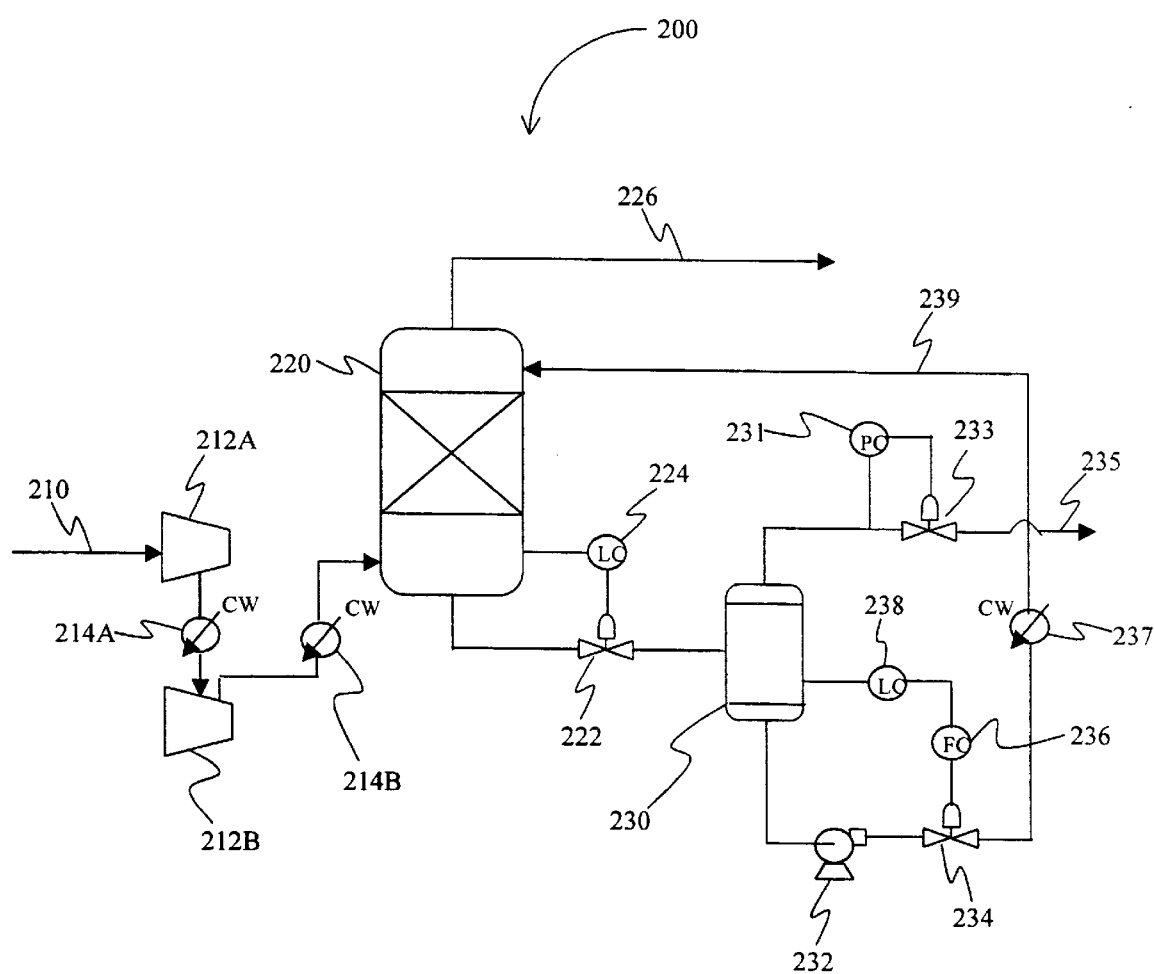
FIG. 2 is a schematic of another apparatus for recovering a first and a second component from an offgas of a PSA according to the present inventive subject matter.

In FIG. 2 a schematic of another apparatus 200 for recovering hydrogen and carbon dioxide from an offgas of a PSA is shown. The apparatus 200 generally has a multi stage compressor configuration with compressors 212A and 212B, and a cooling system 214A and 214B in which a stream of offgas 210 from a first PSA unit is compressed. The compressed offgas is transferred to the absorber unit 220, and a stream of enriched compressed offgas 226 is transferred to a second PSA unit (not shown), where hydrogen is recovered from the enriched compressed offgas. The $CO_2$-rich solvent from the absorber is directed to a flash unit 230 under control of level controller 224 and valve 222. The regenerated solvent is recycled to the absorber unit 220 via pump 232, valve 234, flow controller 236, level controller 238, and line 239. Cooling system 237 cools the regenerated solvent. A product stream 235 of $CO_2$ from the flash unit is transferred to a vent or liquefaction unit (both not shown), whereby the flow is regulated by a valve 233 and a pressure controller 231.

Figure 3:
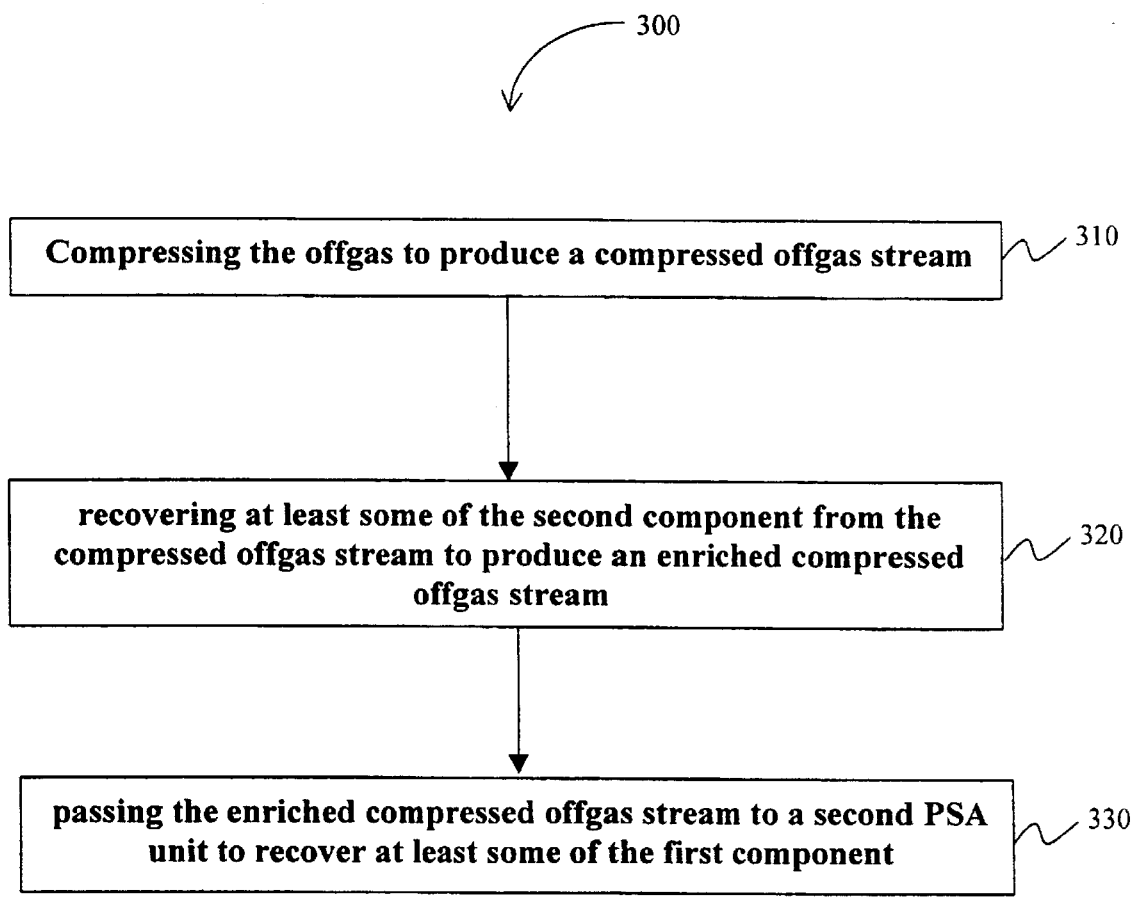
FIG. 3 is a flow diagram of a method of recovering a first and a second component from an offgas of a PSA unit according to the present inventive subject matter.

In FIG. 3, a method 300 of recovering a first component and a second component from an offgas of a first pressure swing adsorption (PSA) unit has a first step 310 in which the offgas of a PSA unit is compressed to produce a compressed offgas stream. In a subsequent step 320, at least some of the second component is recovered from the compressed offgas stream to produce an enriched compressed offgas stream, and in a next step 330, the enriched compressed offgas stream is passed to a second PSA unit to recover at least some of the first component.

In a preferred embodiment, the first PSA unit is a hydrogen PSA unit that has $H_2$ as a product gas, and that produces an offgas comprising $H_2$ and $CO_2$. A compressor compresses the offgas to a pressure of about 300–500 psig to produce a compressed offgas stream. At least some of the $CO_2$ is recovered from the compressed offgas stream in an absorber unit employing Fluor Solvent™ as a fluid solvent to form an enriched compressed offgas stream (i.e. compressed offgas depleted from $CO_2$). The enriched compressed offgas is then fed into a second hydrogen PSA unit.

With respect to the feed gas, the first and second PSA units, the absorber unit, and the compressor, the same considerations apply for the same components as discussed in FIG. 1. It is further contemplated that in some embodiments the second component, which may or may not be $CO_2$, is recovered from the rich solvent by decompression in a flash unit by letting down the solvent to a pressure of between about 0–50 psia. The recovered second components may thereby be further isolated and/or purified in a liquefaction unit, but it is also contemplated that recovered second component may also be combusted in a steam reformer burner. In further alternative aspects of the inventive subject matter, at least part of the second offgas may be combusted in a steam reformer.

It should be especially appreciated that multiple advantages are achieved with the inventive subject matter presented herein. While both $H_2$ and $CO_2$ are recovered in the process, the additional recovery of hydrogen from the offgas of a PSA unit does not produce any incremental amount of $NO_X$. Furthermore, the reformer combustion efficiency can be improved due to the absence of the low BTU PSA offgas.

Thus, specific embodiments and applications of recovery of $CO_2$ and $H_2$ from the offgas from a pressure swing adsorption unit have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of recovering a first component and a second component from an offgas of a first pressure swing adsorption (PSA) unit, comprising:

compressing the offgas to produce a compressed offgas stream;

recovering at least some of the second component from the compressed offgas stream to produce an enriched compressed offgas stream that is at least partially depleted from the second component;

passing the enriched compressed offgas stream to a second PSA unit to recover at least some of the first component; and further comprising providing the feed gas as a gas stream from a steam reformer.

2. The method of claim 1 wherein the first component is $H_2$.

3. The method of claim 1 wherein the second component is $CO_2$.

4. The method of claim 1 further comprising utilizing a solvent to recover at least part of the second component.

5. The method of claim 4 further comprising recovering at least part of the second component from the solvent by decompression of the solvent.

6. The method of claim 5 further comprising combusting at least part of the recovered second component in a steam reformer burner.

7. The method of claim 1 further comprising combusting at least part of the second offgas in a steam reformer burner.

8. A gas separation apparatus, comprising:

a first pressure swing adsorption (PSA) unit that receives a feed gas comprising at least a first component and a second component, wherein the first PSA unit produces a first product gas predominantly comprising the first component, and a first offgas comprising at least some of the first component and at least some of the second component;

a compressor fluidly coupled to the first PSA unit that compresses the offgas to form a compressed offgas;

an absorber unit downstream of the compressor that employs a solvent to remove at least part of the second component from the compressed offgas to form an enriched compressed offgas that is at least partially depleted from the second component;

a second PSA unit that receives the enriched compressed offgas and produces a second product gas predominantly comprising the first component, and a second Offgas; and further comprising a flash unit that regenerates the solvent and produces a stream of concentrated second component.

9. The apparatus of claim 8 further comprising a liquefaction unit fluidly coupled to the flash unit that liquefies the second component stream.

10. The apparatus of claim 9 wherein the liquefaction unit comprises an autorefrigeration system.

11. The apparatus of claim 8 further comprising a reformer burner that receives at least part of the second offgas.

12. The apparatus of claim 8 wherein the first PSA unit is a hydrogen PSA unit.

13. The apparatus of claim 8 wherein the feed gas comprises a gas stream from a steam reformer.

14. The apparatus of claim 13 wherein the gas stream predominantly comprises $H_2$, $CO_2$, CO, and $CH_4$.

15. The apparatus of claim 8 wherein the fit component is $H_2$.

16. The apparatus of claim 8 wherein the second component is $CO_2$.

17. The apparatus of claim 8 wherein the compressed offgas has a pressure of between 300–500 psig.

18. The apparatus of claim 8 wherein the solvent is selected from the group consisting of a dimethylether of polyethylene glycol and propylene carbonate.

* * * * *